(No Model.)
S. A. PARKE.
SAW TOOTH SWAGING MACHINE.
No. 358,068. Patented Feb. 22, 1887.
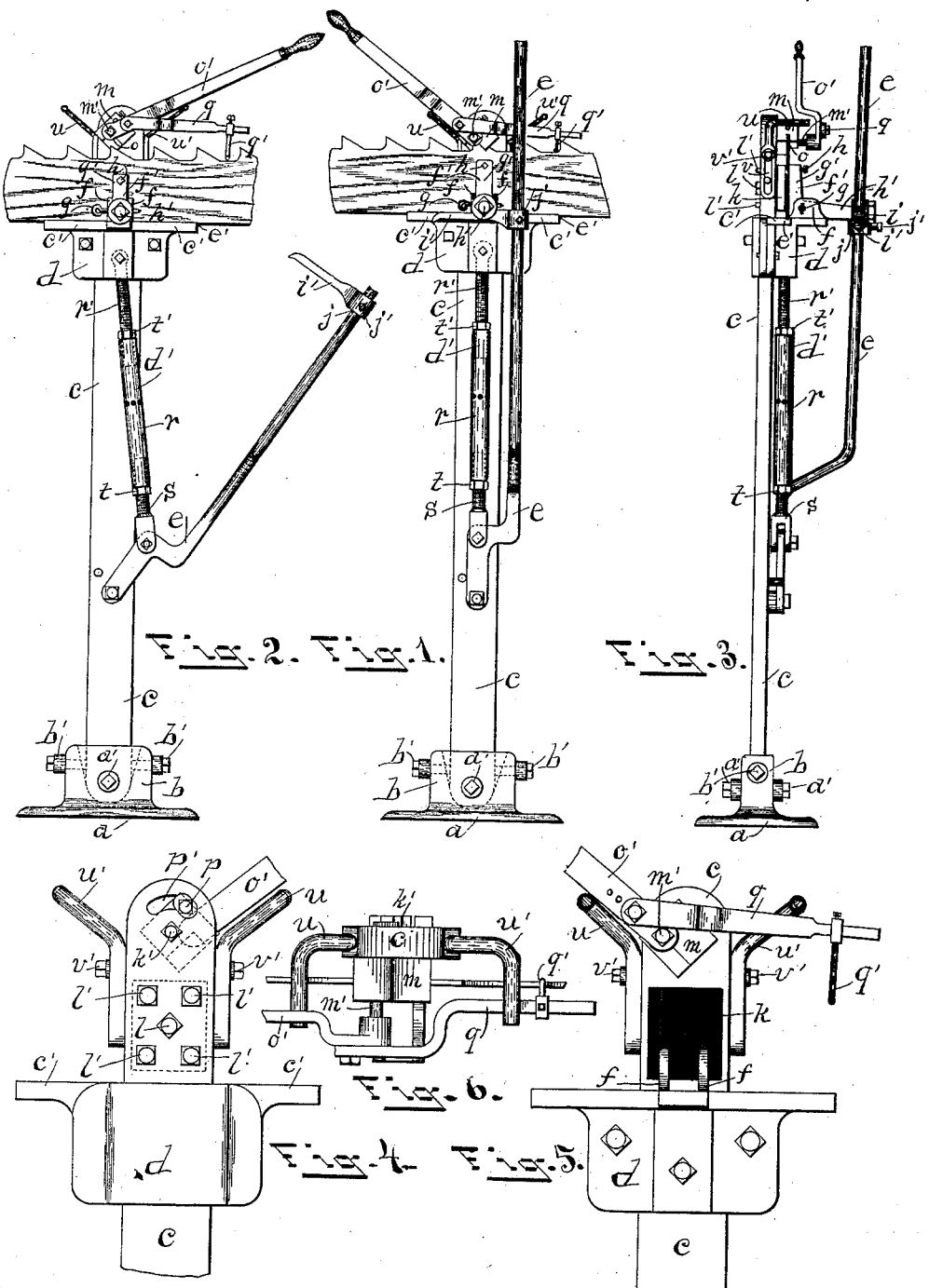

UNITED STATES PATENT OFFICE.

SARAH A. PARKE, OF BAY CITY, MICHIGAN.

SAW-TOOTH-SWAGING MACHINE.

SPECIFICATION forming part of Letters Patent No. 358,068, dated February 22, 1887.

Application filed October 4, 1886. Serial No. 215,235. (No model.)

*To all whom it may concern:*

Be it known that I, SARAH A. PARKE, a citizen of the United States, residing at Bay City, in the county of Bay and State of Michigan, have invented certain new and useful Improvements in Saw-Tooth-Swaging Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates more especially to improvements on the device for swaging sawteeth described in Letters Patent granted to me January 5, 1886, No. 333,540, although it may be applied to machines which operate to swage the saw-tooth in a different manner; and the improvement consists, chiefly, in the combination and arrangement of devices for supporting the swage-block in different positions, in devices for clamping the saw, in devices for automatically moving the saw, and means for lowering the saw for moving to the next tooth and raising the saw again in position for swaging.

The objects of the invention are to produce a more convenient and easily-operated swaging-machine, and to produce a machine which will be quicker in its operation and that does not require an expert to operate and place it upon the saw-tooth in a proper position, whereby the time and expense of swaging the saw-teeth is greatly reduced, besides making the teeth of the saw more uniform and more easily fitted up for cutting. The devices I employ to attain these objects are illustrated in the accompanying drawings, in which—

Figure 1 is a front view of my improved machine with the parts in position after the tooth has been operated upon. Fig. 2 is the same with the saw lowered for moving to the next tooth to be swaged. Fig. 3 is a side view of Fig. 1, looking from the left. Fig. 4 is a view of the rear side of the upper portion of the machine. Fig. 5 is a front view of the same with the clamping device removed for placing the saw in position. Fig. 6 is a top or plan view of Fig. 5.

$a$ represents a base or foot piece, which is firmly bolted or secured to the floor, and provided on its upper portion with a socket, $b$, into which is fitted the lower end of a vertical standard, $c$, and which is therein secured by a bolt, $a'$, passing through the standard and socket in a manner that the upper end of the standard may be swung in either direction and secured in any desired position by the bolts $b'$, which are passed through the end walls of the socket and bear against the edges of the standard.

$c'$ is a table adjustably secured to the upper portion of the standard by a portion, $d$, which surrounds and slides upon the standard, and is held in position by a connecting-piece, $d'$, which is pivotally secured by one end to the part $d$, and by its opposite end to a lever, $e$, at a short distance from the lower end thereof, which is pivoted to the lower portion of the standard. This lever $e$ is bent just at the point of connection with the piece $d'$ in a lateral direction, and is then again bent upward and outward, and extends to a considerable distance above the table $c'$.

The upper surface of the table $c'$ is provided, near the standard, with a groove, $e'$, in which the rear edge of the saw is placed, and on the outer portion of the table are arranged the upward-extending lugs $f$, and between these lugs is placed the elbow-lever $f'$, a pin, $g$, passing through the lugs and lever and securing the lever in position. The upward-extending arm $g'$ of this lever is arranged to be just outside of the saw, and the upper end of the arm is provided with a screw, $h$, passing through the arm, and with its inner end pressing against the side of the saw when the arm is moved inwardly. The other arm, $h'$, which extends horizontally outward from the pivoted point, is provided with a roller, $i$. A piece, $i'$, provided with a socket, $j$, which surrounds the lever $e$, is placed in a proper position, so that when the lever $e$ is pulled to a vertical position the piece $i'$ will operate to bear against the roller $i$ and raise the arm $h'$ and cause the arm $g'$ to move inward toward the saw, and the piece $i'$ is held in position by a set-screw, $j'$, passed through the socket and against the lever $e$. The free end of the piece $i'$ is slightly curved downward, so that it may easily engage with the roller and lift upward the arm $h'$.

Secured by the screw $l$ to the face of the standard c, above the table, is a clamping-piece, k, which is made adjustable to and from the standard by the screws l', passing through the standard and bearing against the inner face of the clamping-piece. These screws allow the piece to be adjusted and hold the piece in any desired angle with the face of the standard.

Above the piece k, and to the upper end of the standard c, is secured by a bolt, k', a swage-block, m. This block m is of the same form and construction, and contains swaging devices similar to those shown in Letters Patent No. 333,540, before mentioned.

The block m is adjustably secured in position by a bolt, p, which passes through the slot p' in the standard and into the block. This adjustment allows the block to be tilted to fit the anvil-die upon any form of saw-tooth, and when properly adjusted the bolt p is tightened, which holds the block firmly in position.

m' represents a shaft passing into the swage-block m, and is provided with a die-face exposed within the slot o, and the outer end of the shaft is arranged for attaching a lever, o', for rotating the shaft, and pivoted by one end to the lever o' is an arm, q, having a portion, q', which is arranged to engage with the teeth of the saw when the lever is operated on its backward movement, and this moves the saw one tooth or places the next tooth in a proper position for swaging, and when the lever is operated for swaging the part q' slides over the inclined side of the tooth and again engages with the next tooth and again moves the saw with the backward motion of the lever.

In operation the lever e is thrown well downward, which lowers the table c'. The pin g is then withdrawn and the elbow-lever f' removed. The saw is then placed in position and the lever f' replaced and secured. The lever e is then drawn upward, moving upward the table until the connecting-rod d' is in nearly a vertical position together with the lower portion of the lever e. The piece i' then engages with the roller i as the lever e is further operated and raises the outer end, which operates the end g' inwardly and brings the inner end of the screw h to bear against the saw and press it firmly against the clamping-piece k. This operation brings the saw-tooth in a proper position to be acted upon by the swaging-die and firmly holds it in place during the swaging operation, which consists in moving forward the lever o' and rotating the shaft m'. The lever e is then pushed backward, which releases the saw from the clamping devices and lowers the table until the saw is free from the swage-block m. The lever o' is then moved backward and the piece q' and arm q operate to move the saw to the required distance for bringing the next tooth in a proper position for entering upon the die-face whenever the lever e is again operated. The table c' is adjusted to different heights for receiving saws of different widths by the connecting-rod d', being formed with a sleeve, r, having in its opposite ends right and left hand screw-threads, and the parts r' and s are provided with corresponding screw-threads and pass into the sleeve, so that when the sleeve is rotated it operates to draw inward or push outward both of the parts r' and s, and jam-nuts t and t' are passed upon the pieces r' and s, by which the parts are held firmly in position when the length of the rod is properly adjusted.

u and u' are pieces provided with a slot, v, at one end, through which and into the edges of the standard c are passed the screw-bolts v', which hold the pieces in position and allow a vertical adjustment thereof. These pieces extend diagonally in a lateral direction, and are then turned outward and operate to arrest the movement of the lever o' at the desired point.

Other swaging devices may be applied to the standard instead of the block m and shaft m', provided with a die-face, and the operation of the devices for holding and moving the saw will operate in the same manner and produce the same result as before described.

What I claim as my invention, and desire to secure by Letters Patent, is—

1. The combination, in a saw-tooth-swaging machine, of the base a, provided with a socket, b, a vertical standard, c, with one end within the socket, and a bolt, a', passed through the socket and standard, with the screw-bolts b' passed through the end walls of the socket and bearing against the edges of the standard, substantially as and for the purpose herein set forth.

2. In a machine for swaging saw-teeth, the combination, with a vertical standard and a lever, e, pivoted to the lower end of the standard, of a supporting-table secured to and sliding upon the standard and a rod, d', with one end pivotally secured to the lower portion of the table and with its opposite end pivoted to the lever e, substantially as and for the purpose herein set forth.

3. The combination, in a machine for swaging saw-teeth, of a vertical standard, a lever, e, pivoted to the lower portion of the standard, and a supporting-table, as c', adjustably secured to the standard, with a sleeve, r, provided in its opposite ends with a right and left hand screw-thread, the portion r', pivoted by one end to the table and provided on its opposite end with a screw-thread engaging with the screw-thread in the upper end of the sleeve, and the piece s, pivoted by one end to the lever and provided on its opposite end with a screw-thread engaging with the screw-thread in the lower end of the sleeve, substantially as herein set forth.

4. The combination, in a machine for swaging saw-teeth, of the vertical standard c, the table c', adjustably secured to the standard, with a clamping-piece, k, secured to the face of the standard above the table, a lever, f', pivotally secured to the upper portion of the table and provided with the upward-extending arm $g'$ and the horizontal arm $h'$, and means, substantially as herein described, operating the lever for clamping the saw, substantially as herein set-forth.

5. The combination, in a machine for swaging saw-teeth, of a standard, $c$, provided with swaging devices secured to its upper end, a table, $c'$, adjustably secured to the standard and supporting the saw, a lever, $e$, pivoted to the lower portion of the standard, a rod, $d'$, connecting the lever with the table, and a clamping-piece, $k$, secured to the standard above the table, with a lever, $f'$, pivotally secured to the table and having a vertical arm, $g'$, provided with an adjusting-screw, $h$, and a horizontal arm, $h'$, provided with a roller, $i$, and a piece, $i'$, secured to the lever $e$ and engaging with the roller $i$, substantially as and for the purpose herein set forth.

6. In a machine for swaging saw-teeth, the combination, with the die-operating lever, of an arm, as $q$, pivoted to the lever and provided on its free end with a piece, as $q'$, catching into the saw-tooth and moving the saw with the backward movement of the die-lever, substantially as and for the purpose herein set forth.

7. In a machine for swaging saw-teeth, the combination, with a vertical standard, a swage-block, as $m$, secured to the upper portion of the standard, and a lever, as $o'$, operating the swaging-die, of the stops $u$ and $u'$, provided with the slots $v$, and the bolts $v'$, passed through the slots and into the edges of the standard, substantially as and for the purpose herein set forth.

In testimony whereof I affix my signature in presence of two witnesses.

SARAH A. PARKE.

Witnesses:
J. E. THOMAS,
JULIA ANDERSON.